United States Patent
Ogata et al.

(10) Patent No.: US 8,047,347 B2
(45) Date of Patent: Nov. 1, 2011

(54) OUTER RETAINER FOR ONE-WAY CLUTCH

(75) Inventors: Hirofumi Ogata, Kakegawa (JP); Hiroki Segawa, Fukuroi (JP); Kazuhiko Isobe, Fukuroi (JP)

(73) Assignee: NSK-Warner K.K., Tokyo (JP)

( * ) Notice: Subject to any disclaimer, the term of this patent is extended or adjusted under 35 U.S.C. 154(b) by 693 days.

(21) Appl. No.: 12/176,329

(22) Filed: Jul. 18, 2008

(65) Prior Publication Data

US 2009/0020389 A1 Jan. 22, 2009

(30) Foreign Application Priority Data

Jul. 19, 2007 (JP) .................................. 2007-188559
Jun. 16, 2008 (JP) .................................. 2008-156978

(51) Int. Cl.
*F16D 41/07* (2006.01)
(52) U.S. Cl. .................................... 192/45.1; 192/41 R
(58) Field of Classification Search ............. 192/45.1, 192/41 A See application file for complete search history.

(56) References Cited

U.S. PATENT DOCUMENTS

| 5,000,303 | A | * | 3/1991 | Shoji et al. | 192/45.1 |
| 5,480,013 | A | * | 1/1996 | Fujiwara et al. | 192/45.1 |
| 7,055,666 | B2 | * | 6/2006 | Nishimura et al. | 192/45.1 |

FOREIGN PATENT DOCUMENTS

JP 63-115637 U 7/1988

* cited by examiner

*Primary Examiner* — Rodney Bonck
(74) *Attorney, Agent, or Firm* — Miles & Stockbridge P.C.

(57) ABSTRACT

An outer retainer includes a pair of annular portions facing each other in an axial direction and a plurality of column members connecting the annular portions. A plurality of window portions is formed by the annular portions and the column members, and an outward flange is provided at one side end thereof. The column member between window portions in predetermined positions is cut and the cut portion on the outward flange side is bent radially outward to be an elastic member. Paired cut-away portions are formed in predetermined portions of the outward flange with the elastic member disposed between the paired cut-away portions. In the thus-configured outer retainer, at least three window portions are disposed between the elastic member and the cut-away portion adjacent to the elastic member in the peripheral direction. Column members between paired cut-away portions are bent outward in the radial direction to be enlarged in diameter.

2 Claims, 4 Drawing Sheets

OUTER RETAINER FOR ONE-WAY CLUTCH

This application claims the benefit of Japanese Patent Applications No. 2007-188559 and No. 2008-156978 which are hereby incorporated by reference.

BACKGROUND OF THE INVENTION

1. Field of the Invention

The present invention relates to an outer retainer for a one-way clutch that is employed for an automatic transmission and the like of a vehicle.

2. Related Background Art

The automatic transmission and the like of the vehicle involves using the one-way clutch that transmits rotary force on a driving side in one direction but does not transmit the rotary force in the opposite direction.

A conventional sprag type one-way clutch is constructed of an inner race and an outer race that are concentric and make relative rotations and of a one-way clutch mechanism interposed between the inner race and the outer race. The one-way clutch mechanism is built up by a plurality of sprags defined as torque transmitting members, a spring member that biases the sprags in an engaging direction, a cylindrical inner retainer and an outer retainer which hold the sprags and restrain an excessive inclination thereof, and a pair of end bearings that ensure operations of the sprags by retaining these two retainers at a predetermined interval.

The outer retainer is constructed of two annular portions facing each other in an axial direction and a plurality of column members connecting these annular portions and provided at a predetermined interval in a peripheral direction. The outer retainer has a plurality of window portions each configured by the neighboring column members and the two annular portions at a predetermined interval in the axial direction. Further, one annular portion is formed with an outward flange directed outward in a radial direction at an end on the opposite side to the other annular portion in the axial direction, i.e., at an end of the outer retainer in the axial direction. The outward flange engages with an engagement groove formed in an inner peripheral face of the outer race, thereby positioning and supporting the outer retainer with the outer race.

The inner retainer and the outer retainer have substantially the same configuration, however, a flange of the inner retainer formed at an end in the axial direction is an inward flange directed inward in the radial direction.

In the thus-constructed one-way clutch, in the case of transmitting torque with the outer race serving as a driving race for applying rotary force to sprags, it is required to apply proper drag torque to between the outer retainer and the inner peripheral face of the outer race in order to surely transmit an operation to the sprags such as when an abrupt operation is applied to the outer race.

A known means for obtaining the drag torque is a means that forms a shaped portion called a T-bar or an i-bar in the outer retainer, gets the shaped portion deformed and thus brings the shaped portion into contact with the inner peripheral face of the outer race. The T-bar is formed by a portion of the annular portion on the side of the outward flange cut away at two portions thereof defining respectively two window portions neighboring each other and the column member between the window portions neighboring each other. In other words, this T-bar forming means configures a T-bar defined as a T-shaped portion by the column member between the neighboring window portions and the divided outward flange-sided annular portion between the two cut-away portions. A plurality of thus-formed T-bars are provided at a predetermined interval, and the column members of these T-bars are bent outward in the radial direction by a predetermined quantity. The divided and radially outward flange of the T-bar engages with an engagement groove formed in an inner peripheral face of the outer race. The flange engaging with the engagement groove serves as a mechanism for preventing a removable of the outer retainer after being assembled to the outer race.

Moreover, the i-bar defined as an i-shaped portion is formed by cutting a part of one column member, closer to the annular portion, between the neighboring window portions so as to separate the column member into two column portions. A scheme is that a plurality of the thus-configured column members are provided at a predetermined interval, one of the separated column portions of each thus-configured column member, is bent outward in the radial direction into an elastic member, the outer retainer is held on the inner peripheral face of the outer race by dint of spring action of the elastic member, and the elastic member abuts on the inner peripheral face of the outer race, thereby obtaining the drag torque.

Japanese Utility Model Laid-Open Publication No. 63-115637 discloses an outer retainer having a connected T-bar structure in which the T-bars are formed so as to be connected in the peripheral direction, and peripheral rigidity of the T-bar is thus improved.

Further, U.S. Pat. No. 5,000,303 discloses an outer retainer having a configuration that an i-bar is, as illustrated in FIG. 4, built up by providing a column member $112_2$ with a cut portion $118_1$ in an outer retainer 103, the i-bar serving as an elastic member $116_1$ being slid on an inner peripheral face of an outer race, and further cut-away portions $117_1$, $117_2$ are formed by cutting through annular portions 110b on the side of an outward flange 113, at portions where window portions $115_1$, $115_4$ on both sides of window portions $115_2$, $115_3$ adjacent to the elastic member are provided with the column member $112_2$ formed with the elastic member $116_1$ being centered. The portion of the annular portion 110b between the cut-away portions $117_1$ and $117_2$ get deformed to open in the peripheral direction, that is, enlarge outwardly in the radial direction. Thus, the outer retainer is deformed, whereby an outer diametrical face of the outward flange is slid on the inner peripheral face of the outer race.

As in the outer retainer illustrated in FIG. 4, however, if an interval in the peripheral direction between the cut-away portion formed in the annular portion on the outward flange side and the column member formed with the elastic member, is small, namely, if the cut-away portions are provided at the window portions existing on both the sides of the window portions adjacent to the elastic member with this elastic member being centered, the outer retainer is easy to be broken due to a stress. That is, in the case of the one-way clutch used for a starter etc, there is a sharp fluctuation in rotations as when an engine abruptly starts up, and there is the increased amplitude of the stress applied to the retainer due to centrifugal force. Consequently, if a position of the elastic member acting to support the outer retainer on the inner peripheral face of the outer race is close to a position of the cut-away portion provided at the annular portion on the side of the outward flange, a corner part (depicted by, e.g., an ellipse in FIG. 4) of the window portion is easy to be broken due to the amplitude of the stress in the annular portion on the side of the outward flange configuring the window portion formed with the cut-away portion or in the annular portion on the side having none of the outward flange. Namely, a distance from the column cut and deformed to be the elastic member to the cut away portion of the annular portion on the side of the outward flange is shorter, the amplitude of the stress is larger, and both of the corners of the window portions formed with the cut-away portion are easy to be broken.

Further, in the case of forming the cut-away portion and the elastic member simultaneously, if the interval between the cut-away portion and the elastic member is small, i.e., if the distance therebetween is short, the working apparatus itself comes to have a complicated mechanism, resulting in a rise in costs.

SUMMARY OF THE INVENTION

It is an object of the present invention, which was devised under such circumstances, to provide an outer retainer for a one-way clutch, by which a possibility that the outer retainer might be broken is reduced and by which a cut-away portion of an annular portion on the side of an outward flange and an elastic member of a column member are easily worked simultaneously.

To accomplish the above object, according to one aspect of the present invention, there is provided an outer retainer for a one-way clutch comprising: an outer diameter-sided member having an inner peripheral face; an inner diameter-sided member having an outer peripheral face that faces in a radial direction the inner peripheral face of the outer diameter-sided member; a plurality of torque transmitting members interposed between the inner peripheral face of the outer diameter-sided member and the outer peripheral face of the inner diameter-sided member and disposed in an inclinable manner selectively between a position for transmitting torque by engaging with the inner peripheral face and the outer peripheral face and a position in which to become a non-engagement state with the inner peripheral face and the outer peripheral face; a spring member biasing the plurality of torque transmitting members in such a direction as to engage with the inner peripheral face and the outer peripheral face; and a cylindrical inner retainer and a cylindrical outer retainer holding the plurality of torque transmitting members at a predetermined interval in a circumferential direction and restraining an inclination of the torque transmitting members, the outer retainer including a pair of annular portions facing each other in an axial direction and a plurality of column members disposed at a predetermined interval and connecting the pair of annular portions in the axial direction, a plurality of window portions being configured by faces, opposite to each other in a peripheral direction, of the column members neighboring each other and by faces, opposite to each other in the axial direction, of the pair of annular portions, elastic members being formed by cutting predetermined ones of said column members and bending the cut portions of said predetermined ones, on the outward flange side, of said column members outward in the radial direction, said annular portion having said outward flange being formed with a plurality of paired cut-away portions in predetermined positions, said elastic members being respectively disposed between the paired of cut-away portions, the predetermined portions of the annular portion between the respective paired cut-away portions being enlarged in diameter, and the outer diametrical face of each said elastic member being in sliding-contact with said inner peripheral face of said outer diameter-sided member, wherein between said elastic member and said cut-away portion adjacent to said elastic member in the peripheral direction there are at least three of said window portions inclusive of the window portion continuous the cut-away portion.

According to the present invention, it is feasible to provide the outer retainer for the one-way clutch, by which the possibility that the outer retainer might be broken is remarkably reduced and by which the cut-away portion of the annular portion on the side of the outward flange and the elastic member of the column member are easily worked simultaneously. Namely, the possibility of the breakage can be reduced by decreasing the amplitude of the stress applied to the outer retainer in a way that elongates the interval between the elastic member sliding on the inner peripheral face of the outer race and the cut-away portion and by reducing the deformation of the outer retainer due to the amplitude of the stress.

DESCRIPTION OF THE PREFERRED EMBODIMENT

An embodiment of the present invention will hereinafter be described with reference to the drawings.

Figure 1:
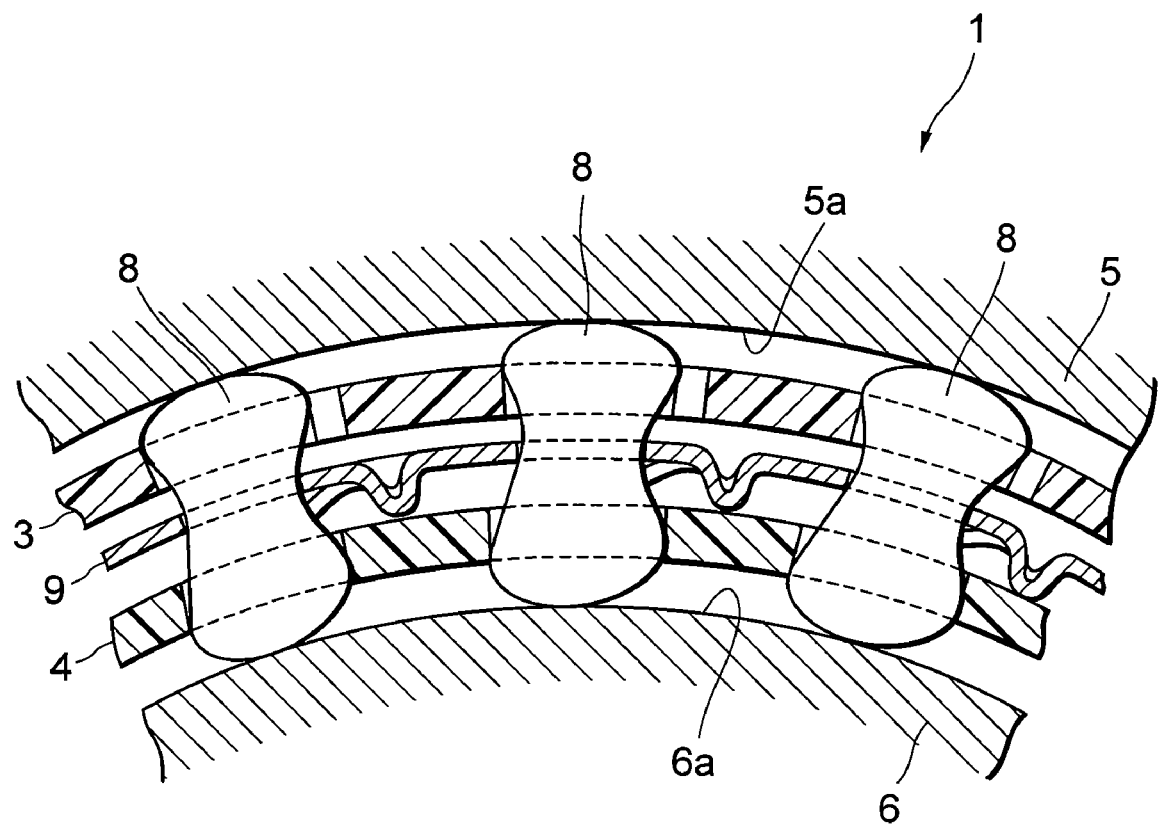
FIG. 1 is a sectional view showing, cut across an axial direction, principal portions of a one-way clutch including an outer retainer for the one-way clutch according to the present embodiment.

FIG. 1 is a sectional view cut across an axial direction, showing principal portions of a one-way clutch including an outer retainer for the one-way clutch according to the present invention.

A one-way clutch 1 includes an outer race 5, an inner race 6, sprags 8, a ribbon spring 9, an outer retainer 3 and an inner retainer 4. The outer race 5 is defined as an outer-diameter-sided member having an inner peripheral face 5a. The inner race 6 is defined as an inner-diameter-sided member having an outer peripheral face 6a that faces the inner peripheral face 5a in a radial direction. The sprags 8 are interposed between the inner peripheral face 5a of the outer race 5 and the outer peripheral face 6a of the inner race 6 and are disposed in an inclinable manner selectively to a position for transmitting torque while engaging with the inner and outer peripheral faces 5a and 6a and to a position in which to make a non-engagement with the inner and outer peripheral faces 5a and 6a. The ribbon spring 9 biases the plurality of sprags 8 in such directions as to engage with the inner and outer peripheral faces 5a and 6a. The outer retainer 3 and the inner retainer 4 each taking a cylindrical shape hold the plurality of sprags 8 at a predetermined interval in a circumferential direction and restrain inclinations thereof.

Figure 2:
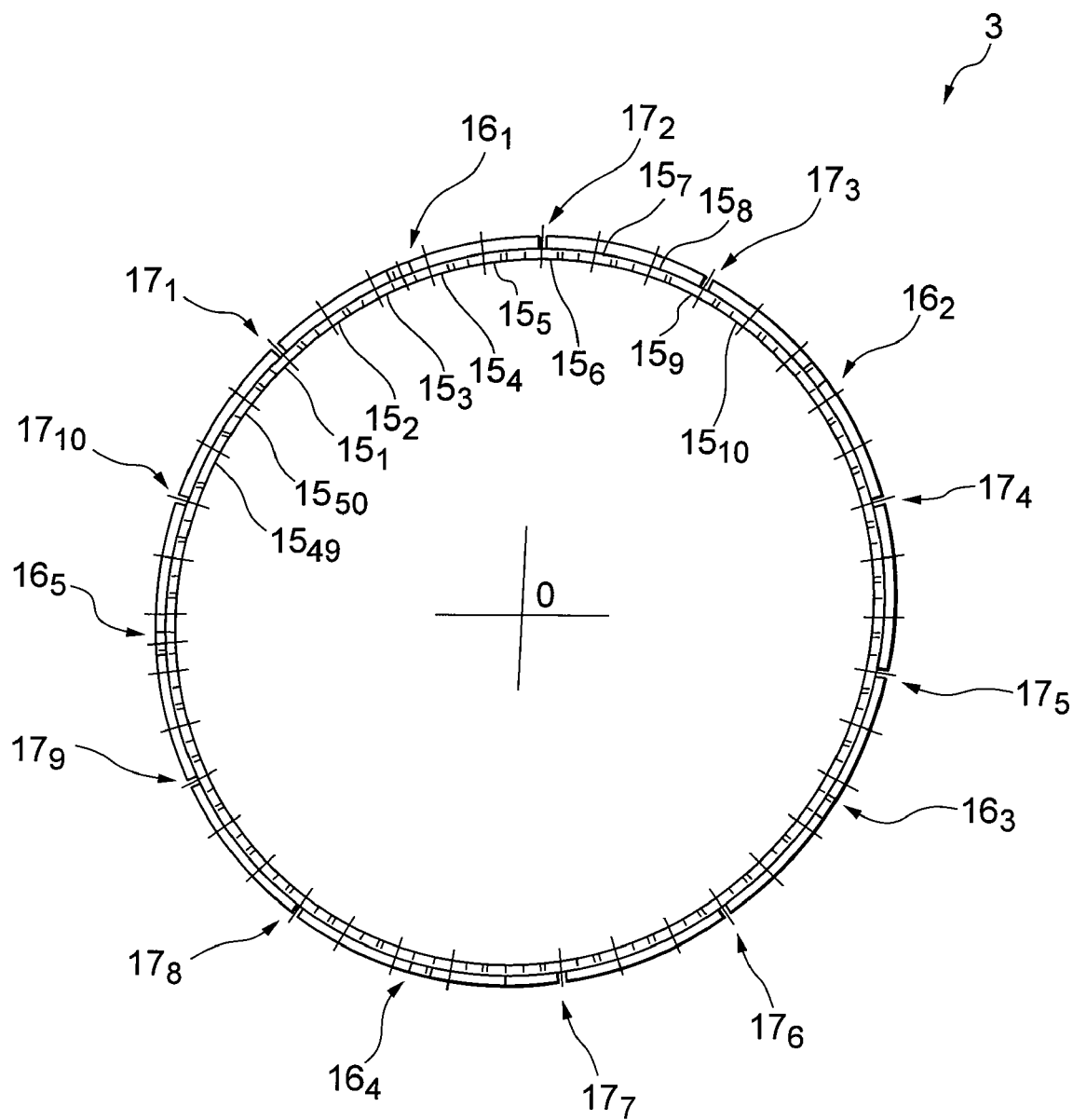
FIG. 2 is a view of the whole of the outer retainer for the one-way clutch according to the present embodiment as viewed in an axial direction.
Figure 3:
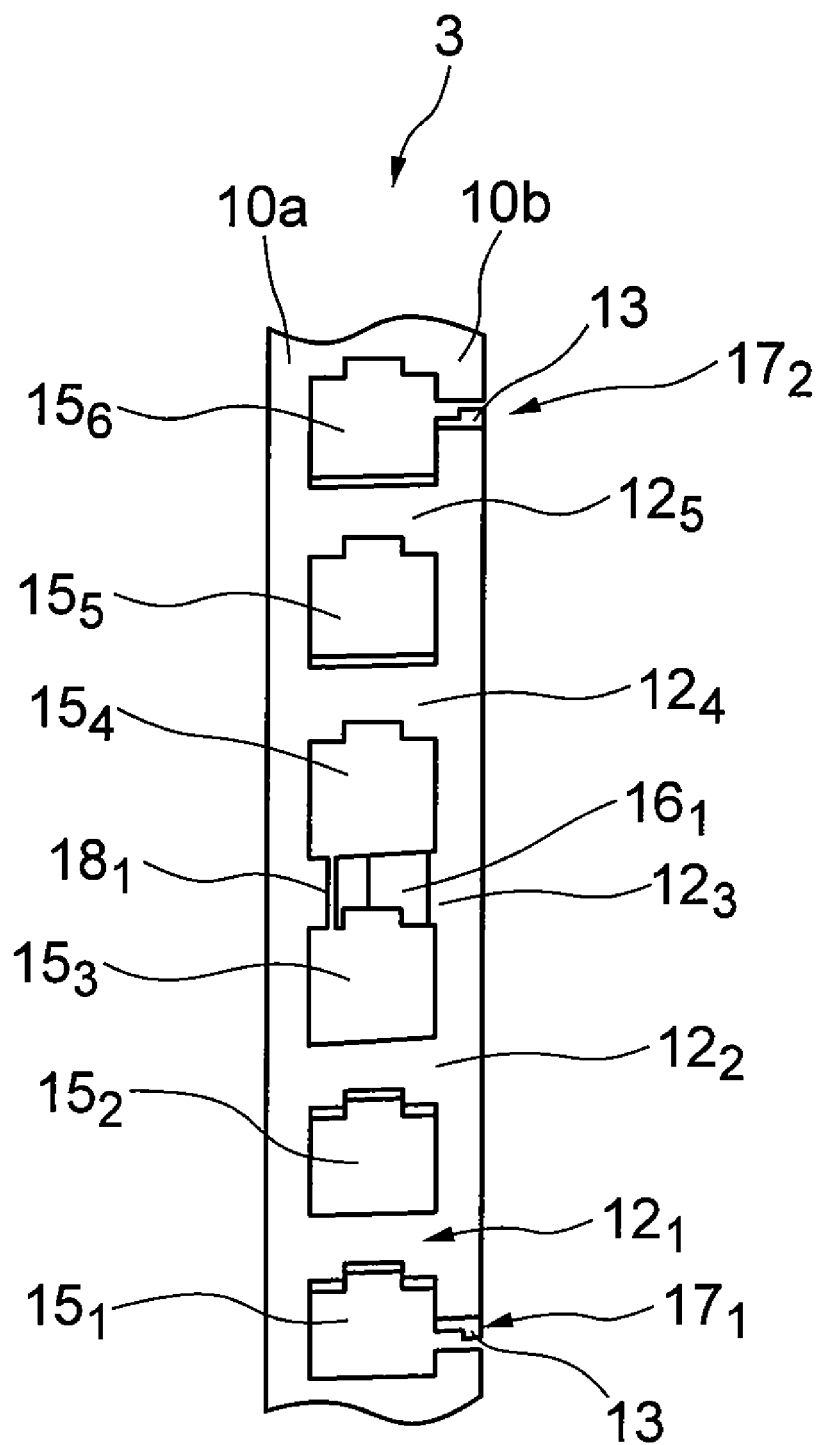
FIG. 3 is an enlarged partial development view showing a part of an inner diameter side of the outer retainer for the one-way clutch according to the present embodiment.
Figure 4:
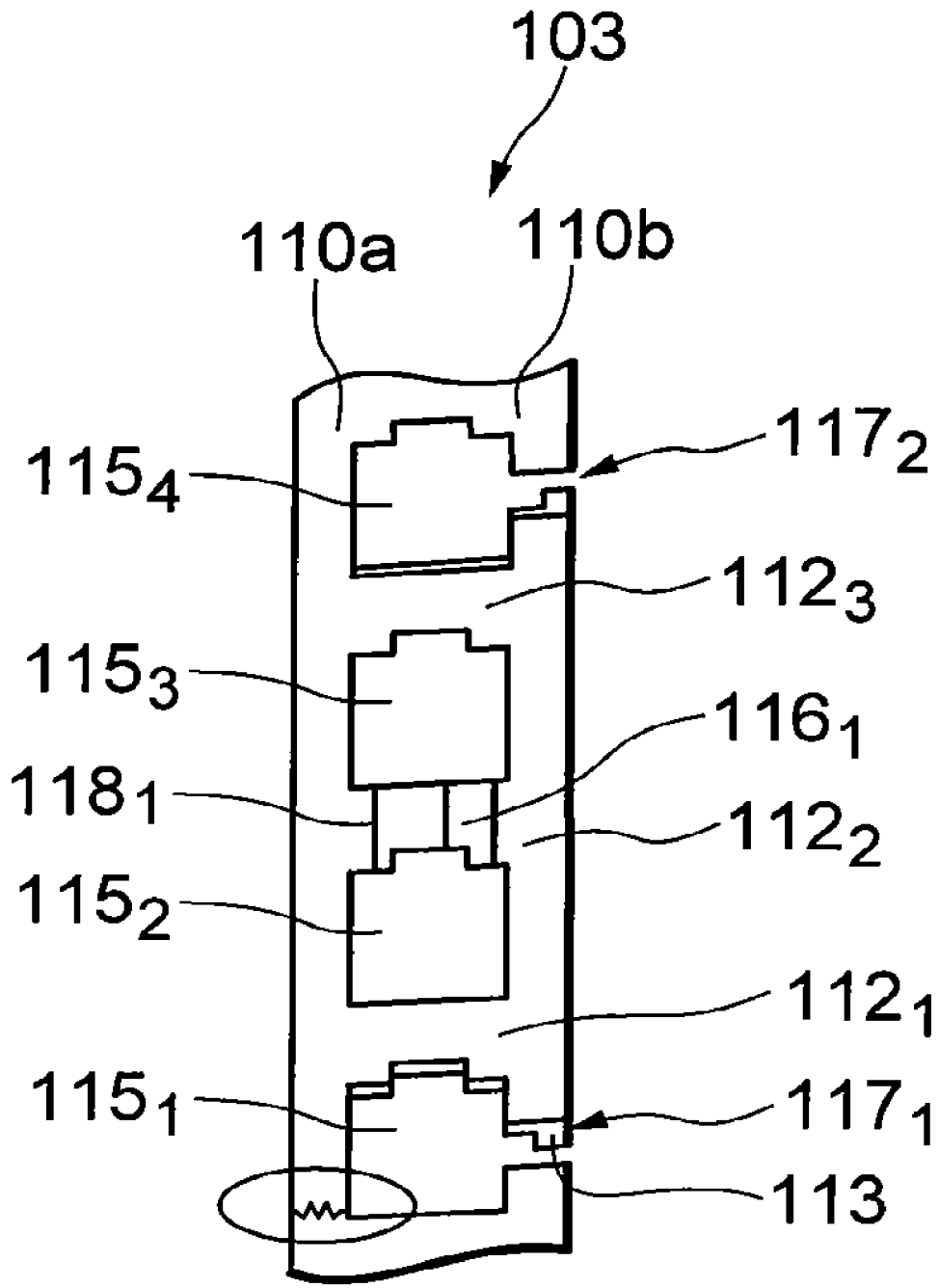
FIG. 4 is an enlarged partial development view showing a part of an inner diameter side of an outer retainer for a one-way clutch according to the prior art.

FIG. 2 is a view of the outer retainer 3 used for the one-way clutch 1 as viewed in an axial direction. FIG. 3 is an enlarged partial development view showing a part of an inner diameter side of the outer retainer 3, when as viewed outwardly in the radial direction from inside thereof.

As illustrated in FIG. 3, the outer retainer 3 is constructed of two annular portions 10a and 10b facing each other in the axial direction and a plurality of column members $12_1, \ldots, 12_n$ (n is an integer, and the same representation is applied to the following) that connect these annular portions 10a, 10b and are provided at a predetermined interval in the peripheral direction. A plurality of window portions $15_1, \ldots, 15_n$ each is configured in the peripheral direction by faces, opposite to each other in the peripheral direction, of the neighboring column members 12 and by faces, opposite to each other in the axial direction, of the two annular portions 10a, 10b. The sprags 8 serving as the torque transmitting members are fitted in one-to-one correspondence into the plurality of window portions $15_1, \ldots, 15_n$. The sprags 8 are held in the inclinable manner within a predetermined range by these window portions $15_1, \ldots, 15_n$.

One annular portion 10b of the annular portions 10a, 10b building up the outer retainer 3 is formed with an outward flange 13 directed outward in the radial direction at an end on the opposite side to the other annular portion 10a in the axial direction, i.e., at one-sided end of the outer retainer 3 in the axial direction.

The outer retainer 3 is formed with elastic members $16_1, \ldots, 16_m$ (m is an integer, and the same representation is applied to the following) defined as means for obtaining predetermined drag torque between the outer retainer 3 and the inner peripheral face 5a of the outer race of the one-way clutch 1. The following discussion will be focused on the elastic members $16_1$, however, other elastic members $16_m$ have the same configuration.

A cut portion $18_1$ is so formed to separate in the axial direction the column member $12_3$ between two window portions $15_3$ and $15_4$ neighboring each other in a position closer to the annular portion 10a on the side having no outward flange 13, thereby an i-shaped configuration being given, and a separated portion of the cut column member $12_3$, which remains on the side of the outward flange, is bent outward in the radial direction to form the elastic member $16_1$. A scheme is that the outer retainer 3 is held by the inner peripheral face 5a of the outer race by dint of spring action of the elastic members $16_1, \ldots, 16_m$ and outer diametrical faces of the elastic members $16_1, \ldots, 16_m$ are made in contact with the inner peripheral face 5a of the outer race 5 so that the drag torque may be obtained. These elastic members are, as illustrated in FIG. 3, provided at a predetermined interval in the peripheral direction.

Paired window portions $15_3, 15_2$ and $15_4, 15_5$ are provided respectively on both sides in the peripheral direction of the column member $12_3$ formed with the elastic member $16_1$, with the column member $12_3$ being centered. The annular portion 10b is formed, at positions where the third window portions $15_1, 15_6$ counted from the column member $12_3$ side are formed, with the cut-away portions $17_1, 17_2$ continuous to the window portions $15_1, 15_6$ so as to separate in the peripheral direction the annular portion 10b. To be specific, the configuration is that the single window portion $15_2$ is disposed between the window portions $15_3$ provided on one side of the column member $12_3$ and the window portions $15_1$ positioned at which the cut-away portion $17_1$ is formed, and the single window portions $15_5$ is disposed between the window portion $15_4$ provided on the other side of the column member $12_3$ and the window portion $15_6$ positioned at which the cut-away portion $17_2$ is formed.

The thus-configured paired cut-away portions are, as shown in FIG. 2, provided at a predetermined interval in the peripheral direction.

The portion of the annular portion 10b between these cut-away portions $17_1$ and $17_2$ gets deformed elastically so as to be enlarged in diameter, by bending column members $12_1$, $12_2, 12_4$ and $12_5$ between the cut away portions $17_1$ and $17_2$.

Other predetermined portions of the annular portion 10b between other predetermined paired cut-away portions are deformable elastically likewise.

The portion of the annular portion 10b between the paired cut-away portions $17_1$ and $17_2$ and the other predetermined portions of the annular portion 10b between predetermined paired cut-away portions thus are deformed elastically, with the result that the outward flanges 13 between predetermined paired cut away portions are deformed outward in the radial direction to be enlarged in diameter and being fitted into an annular engagement groove formed in the inner peripheral face 5a of the outer race in the assembling state, thereby removal of the outer retainer being prevented.

Alternatively, the outer retainer 10b so formed previously that the annular portion 10b on the outward flange side has been enlarged in diameter is formed with the paired cut-away portions $17_1, 17_2; 17_3, 17_4, \ldots$, and then upon assembling the thus formed annular portion 10b is reduced in diameter by being passed through inside the inner peripheral face 5a of the outer race and then is elastically enlarged in diameter to fit in the engagement groove formed in the inner peripheral face 5a of the outer race, thereby removal of the outer retainer being prevented.

Thus, the outer retainer 3 is held on the inner peripheral face 5a of the outer race owing to the plurality of elastic member $16_1, \ldots, 16_n$, and thereby the drag torque is acquired between the inner peripheral face 5a of the outer race and the plurality of elastic member $16_1, \ldots, 16_n$, and the outer race is prevented from being removed by the predetermined plurality of portions of the annular portion 10b between the predetermined paired cut-away portions fitted into and held by the engagement groove formed in the inner peripheral face 5a of the outer race.

The configuration in the present embodiment is that the single window portions $15_2, 15_5$ are interposed respectively between the window portions $15_3, 15_4$ provided on both sides of the column member $12_3$ formed with the elastic member $16_1$ and the window portions $15_1, 15_6$ formed with the cut-away portions $17_1, 17_2$ in the annular portion 10b on the side of the outward flange 13. Namely, three window portions $15_1$, $15_2$ and $15_3$ are disposed between the elastic member $16_1$ and the cut-away portion $17_1$, inclusive of the window portion $15_1$ continuous to the cut-away portion $17_1$, and three window portions $15_4, 15_5$ and $15_6$ are disposed between the elastic member $16_1$ and the cut-away portion $17_2$, inclusive of the window portion $15_6$ continuous to the cut-away portion $17_2$, and an interval between the elastic member and the cut-away portion is set wider than that in the prior art. With this scheme, the amplitude of the stress applied to the cut-away portions $17n, 17_{n+1}$ of the outer retainer 3 by dint of the centrifugal force acting due to the fluctuation in the number of rotations is reduced, and there is a remarkable decrease in the possibility that the outer retainer might be broken. Namely, it is feasible to remarkably reduce the possibility of the breakage by decreasing the deformation of the outer retainer caused by the amplitude of the stress.

In the present embodiment, there are three window portions interposed between the elastic member and the neighboring cut-away portion formed in the annular portion on the side of the outward flange, inclusive of the window portion continuous to that neighboring cut-away portion, however, the number of the windows disposed between the elastic member and the neighboring cut-away portion is not limited to "3". If equal to or larger than "3", such an effect remains unchanged that the amplitude of the stress applied to the cut portion of the outer retainer is reduced, and the possibility of the breakage decreases.

Moreover, the interval between the position of each elastic member $16_1, \ldots, 16n$ and the position of each neighboring cut-away portion of the annular portion $10b$ is wider than that in the conventional outer retainer, and hence, on the occasion of working the outer retainer 3 according to the present embodiment, the elastic members and the cut-away portions can be worked simultaneously without expending the cost. Namely, if the interval between the elastic member and the neighboring cut-away portion is narrow, the working apparatus itself comes to have a complicated structure, and the cost is expended correspondingly. If the intervals between the elastic members and the neighboring cut-away portions are large as in the present embodiment, the working apparatus itself does not require the complicated structure, thereby enabling the cost to be restrained low.

Note that the present embodiment adopts the configuration that the outer retainer 3 having the fifty window portions is, as illustrated in FIG. 3, formed with the five elastic members and the ten cut-away portions, however, the present invention is not limited to this embodiment but can be modified in a variety of modes.

What is claimed is:

1. A one-way clutch comprising:
   an outer diameter-sided member having an inner peripheral face;
   an inner diameter-sided member having an outer peripheral face opposed in a radial direction to said inner peripheral face; and
   a plurality of torque transmitting members interposed between said inner peripheral face of said outer diameter-sided member and said outer peripheral face of said inner diameter-sided member and disposed in an inclinable manner selectively between a position for transmitting torque by engaging with said inner peripheral face and said outer peripheral face and a position in which to be in a non-engagement state with said inner peripheral face and said outer peripheral face;
   a spring member for biasing said plurality of torque transmitting members in such a direction as to engage with said inner peripheral face and said outer peripheral face; and
   a cylindrical inner retainer and a cylindrical outer retainer holding said plurality of torque transmitting members at predetermined intervals in a circumferential direction and restraining an inclination of said torque transmitting members,
   said outer retainer including a pair of annular portions facing each other in an axial direction and a plurality of column members disposed at predetermined intervals and connecting said pair of annular portions in the axial direction, one of the annular portions being formed with a radially outwardly extending flange at an outer axial end thereof,
   a plurality of window portions being configured by faces, opposite to each other in a circumferential direction, of said column members neighboring each other and by faces, opposite to each other in the axial direction, of said pair of annular portions,
   elastic members being formed by cutting portions of predetermined ones of said column members and bending outward in the radial direction the cut portions, on the flange side, of said predetermined ones of said column members,
   said one annular portion being formed with a plurality of paired cut-away portions in predetermined positions,
   said elastic members being disposed between corresponding pairs of cut-away portions,
   determined portions of said one annular portion between corresponding pairs of cut-away portions being enlarged in diameter, and
   an outer diametrical face of each said elastic member being in sliding-contact with said inner peripheral face of said outer diameter-sided member,
   wherein between at least one of said elastic members and at least one of said cut-away portions adjacent to said elastic member in the circumferential direction there are at least three of said window portions, inclusive of a window portion continuous to the at least one cut-away portion.

2. The one-way clutch according to claim 1, wherein between each elastic member and each cut-away portion adjacent to said elastic member in the circumferential direction there are disposed at least three of said window portions, inclusive of a window portion continuous to the cut-away portion.

* * * * *